(12) United States Patent
Tsumagari

(10) Patent No.: US 7,788,902 B2
(45) Date of Patent: Sep. 7, 2010

(54) METHOD FOR DETECTING ABNORMALITY IN EXHAUST EMISSION CONTROL DEVICE

(75) Inventor: Ichiro Tsumagari, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 899 days.

(21) Appl. No.: 11/632,997

(22) PCT Filed: Jul. 21, 2005

(86) PCT No.: PCT/JP2005/013364

§ 371 (c)(1),
(2), (4) Date: Jan. 22, 2007

(87) PCT Pub. No.: WO2006/009195

PCT Pub. Date: Jan. 26, 2006

(65) Prior Publication Data

US 2008/0092522 A1    Apr. 24, 2008

(30) Foreign Application Priority Data

Jul. 23, 2004    (JP) .............................. 2004-215766

(51) Int. Cl.
*F01N 3/00* (2006.01)
*F01N 3/10* (2006.01)
(52) U.S. Cl. .......................................... 60/277; 60/301
(58) Field of Classification Search .................. 60/277, 60/301, 273, 274
See application file for complete search history.

(56) References Cited

U.S. PATENT DOCUMENTS

2004/0098974 A1    5/2004 Nieuwstadt et al.

FOREIGN PATENT DOCUMENTS

| JP | 2000-213335 | 8/2000 |
|---|---|---|
| JP | 2000-356127 | 12/2000 |
| JP | 2002-161732 | 6/2002 |
| JP | 2002-221028 | 8/2002 |
| JP | 2002-256951 | 9/2002 |
| JP | 2002-273176 | 9/2002 |

*Primary Examiner*—Thomas E Denion
*Assistant Examiner*—Michael Carton
(74) *Attorney, Agent, or Firm*—Oblon, Spivak, McClelland, Maier & Neustadt, L.L.P.

(57) ABSTRACT

Enabled is reliable detection of abnormality in a $NO_x$ emission control system.

Disclosed is a method for detecting abnormality in an exhaust emission control device with a reducing agent (urea water 17) being added to selective reduction catalyst 10 incorporated in an exhaust pipe 9 so as to reduce and purify $NO_x$. Temperature of the catalyst during an operation period is monitored to record a cumulative time for each of temperature zones. On the basis of the recorded cumulative time for each of the temperature zones, a deterioration coefficient of $NO_x$ reduction performance is determined for each of the temperature zones. A standard $NO_x$ reduction ratio predetermined for each of the temperature zones is multiplied by the determined deterioration coefficient for each of the temperature zones to update the standard $NO_x$ reduction ratio. The updated standard $NO_x$ reduction ratio is used in a next operation to compare an actually measured $NO_x$ reduction ratio with the standard $NO_x$ reduction ratio on the measured temperature zone. It is determined that there is abnormality when deviation of the actually measured $NO_x$ reduction ratio from the standard $NO_x$ reduction ratio does not fall within a required range.

16 Claims, 2 Drawing Sheets

METHOD FOR DETECTING ABNORMALITY IN EXHAUST EMISSION CONTROL DEVICE

TECHNICAL FIELD

The present invention relates to a method for detecting abnormality in an exhaust emission control device for reduction and purification of $NO_x$ in exhaust gas.

BACKGROUND ART

Conventionally, some diesel engines have selective reduction catalyst incorporated in an exhaust pipe through which exhaust gas flow, said catalyst having a feature of selectively reacting $NO_x$ with a reducing agent even in the presence of oxygen; a required amount of reducing agent is added upstream of the catalyst to be reacted with nitrogen oxides ($NO_x$) in exhaust gas on the catalyst to thereby reduce a concentration of the discharged $NO_x$.

Meanwhile, effectiveness of ammonia ($NH_3$) used as a reducing agent for reduction and purification of $NO_x$ is well known in a field of industrial flue gas denitration, for example, in a plant. However, in a field of automobile where safety is hard to assure as to running with ammonia itself being loaded, researches have been made nowadays on use of nontoxic urea water as the reducing agent (see, for example, Reference 1).

[Reference 1] JP 2002-161732A

More specifically, addition of the urea water to the exhaust gas upstream of selective reduction catalyst under a temperature condition of about 170-180° C. or more causes the urea water to be decomposed into ammonia and carbon monoxide, and $NO_x$ in the exhaust gas on the catalyst is satisfactorily reduced and purified by ammonia.

SUMMARY OF THE INVENTION

Problems to be Solved by the Invention

However, in such conventional exhaust emission control device, which has no means for detecting abnormality in a system, there is a fear that the operation may be continued without notice of deterioration of the catalyst due to its repeated exposure to higher temperature condition for a long period of time or without notice of abnormality in sensors due to unexpected malfunction, which leads to no attainment of target $NO_x$ reduction ratio.

The invention was made in view of the above and has its object to make it possible to reliably detect abnormality in a $NO_x$ emission control system.

Means or Measures for Solving the Problems

The invention is directed to a method for detecting abnormality in an exhaust emission control device with a reducing agent being added to selective reduction catalyst incorporated in an exhaust pipe so as to reduce and purify $NO_x$, which comprises monitoring a temperature of the catalyst during an operation period to record a cumulative time for each of temperature zones, determining a deterioration coefficient of $NO_x$ reduction performance for each of the temperature zones on the basis of the recorded cumulative time for each of the temperature zones, multiplying a standard $NO_x$ reduction ratio predetermined for each of the temperature zones by said determined deterioration coefficient for each of the temperature zones to update said standard $NO_x$ reduction ratio, using the updated standard $NO_x$ reduction ratio in a next operation to compare an actually measured $NO_x$ reduction ratio with the standard $NO_x$ reduction ratio in a measured temperature zone, and determining presence of abnormality when deviation of the actually measured $NO_x$ reduction ratio from the standard $NO_x$ reduction ratio does not fall within a required range.

More specifically, the catalyst incorporated in the exhaust pipe is gradually deteriorated since it is repeatedly exposed under high temperature condition for a long period of time. Since a degree of the deterioration differs depending on how many hours and to what degree of temperature zone the catalyst is exposed, a temperature of the catalyst during an operation period is monitored as mentioned above to record a cumulative time for each of the temperature zones. A standard $NO_x$ reduction ratio predetermined for each of the temperature zones is multiplied by a deterioration coefficient of $NO_x$ reduction performance determined on the basis of the recorded cumulative time for each of the temperature zones to update the standard $NO_x$ reduction ratio. Thus, the standard $NO_x$ reduction ratio is highly accurately estimated for each of the temperature zones in consideration of deterioration with age of the catalyst.

Thus estimated standard $NO_x$ reduction ratio is used in a next operation to compare an actually measured $NO_x$ reduction ratio with the standard $NO_x$ reduction ratio in a measured temperature zone. Then, when deviation of the actually measured $NO_x$ reduction ratio from the standard or proper $NO_x$ reduction ratio falls within a required range, the system can be regarded to be normally in operation; and when it does not fall within the required range, it can be determined that the system has some abnormality.

When the invention is to be worked in a more practical manner, it is preferred that a $NO_x$ reduction ratio is measured by $NO_x$ sensors arranged on entry and exit sides of the catalyst, the actually measured $NO_x$ reduction ratio being multiplied by a coefficient of deterioration with age depending upon used hours of the $NO_x$ sensors to correct the actually measured $NO_x$ reduction ratio, which makes it possible to more accurately determine the $NO_x$ reduction ratio also in consideration to the deterioration with age depending upon the used hours of the $NO_x$ sensors to thereby further enhance the accuracy of abnormality determination.

Moreover, it is preferable in the invention that the standard $NO_x$ reduction ratio is further multiplied for correction by poisoning coefficient determined on the basis of amounts of emission of HC and CO derived from an operation condition of the engine, which makes it possible to calculate more accurate standard $NO_x$ reduction ratio also in consideration of the poisoning deterioration of the catalyst due to HC and CO to thereby further enhance the accuracy in abnormality determination.

When the deviation of the actually measured $NO_x$ reduction ratio from the standard $NO_x$ reduction ratio falls below the required range, it can be regarded that the deterioration of the catalyst has progressed abnormally. From such comparison result, it is possible to determine abnormal deterioration in the catalyst. When the deviation of the actually measured $NO_x$ reduction ratio from the standard $NO_x$ reduction ratio is beyond the required range, such situation cannot occur in a normal operation; thus, it can be regarded that some abnormality occurs in the sensors. From such comparison result, it is possible to determine presence of abnormality in the sensors.

Meanwhile, when the standard $NO_x$ reduction ratio updated per operation is lower than a predetermined value, it can be regarded that the deterioration with age of the catalyst has seriously progressed, and therefore it can be determined that the catalyst is to be replaced in near future.

EFFECTS OF THE INVENTION

According to a method for detecting abnormality in an exhaust emission control device of the invention, the following excellent effects and advantages can be obtained:

(I) The highly accurately estimated standard $NO_x$ reduction ratio in consideration of the deterioration with age of the catalyst is compared with the actually measured $NO_x$ reduction ratio, so that abnormality in the $NO_x$ emission control system can be reliably detected. As a result, prevented from occurring is a situation that an operation is continued without notice of deterioration of the catalyst or abnormality in the sensors and resultant failure of attaining the target $NO_x$ reduction ratio.

(II) When the $NO_x$ reduction ratio is measured by $NO_x$ sensors arranged on the entry and exit sides of the catalyst and the thus actually measured $NO_x$ reduction ratio is corrected by multiplying it by a coefficient of deterioration with age depending upon used hours of the $NO_x$ sensors, more accurate $NO_x$ reduction ratio can be determined in consideration of the deterioration with age depending upon the used hours of the $NO_x$ sensors to thereby further enhance the accuracy in abnormality determination.

(III) When the standard $NO_x$ reduction ratio is further corrected by multiplying it by the poisoning coefficient determined on the basis of amounts of emission of HC and CO derived from the operating condition of the engine, then more accurate standard $NO_x$ reduction ratio can be calculated in consideration of the poisoning deterioration of the catalyst due to HC and CO to thereby further enhance the accuracy in abnormality determination.

(IV) When the deviation of the actually measured $NO_x$ reduction ratio from the standard $NO_x$ reduction ratio falls below the required range, it is determined that there is abnormal deterioration of the catalyst; and when it is beyond the required range, it is determined that there is abnormality in the sensors. Thus, when the deviation of the actually measured $NO_x$ reduction ratio from the standard $NO_x$ reduction ratio does not fall within the required range, abnormal deterioration of the catalyst and abnormality in the sensors are determined distinctly from each other depending upon whether the deviation falls below or is beyond the required range.

(V) If it is determined that the catalyst is to be replaced near future when the standard $NO_x$ reduction ratio is lower than a predetermined value, it can be determined that the catalyst is to be replaced when the standard $NO_x$ reduction ratio updated per operation is below the predetermined value. This may be noticed by a driver to accelerate earlier replacement of the catalyst.

Figure 1:
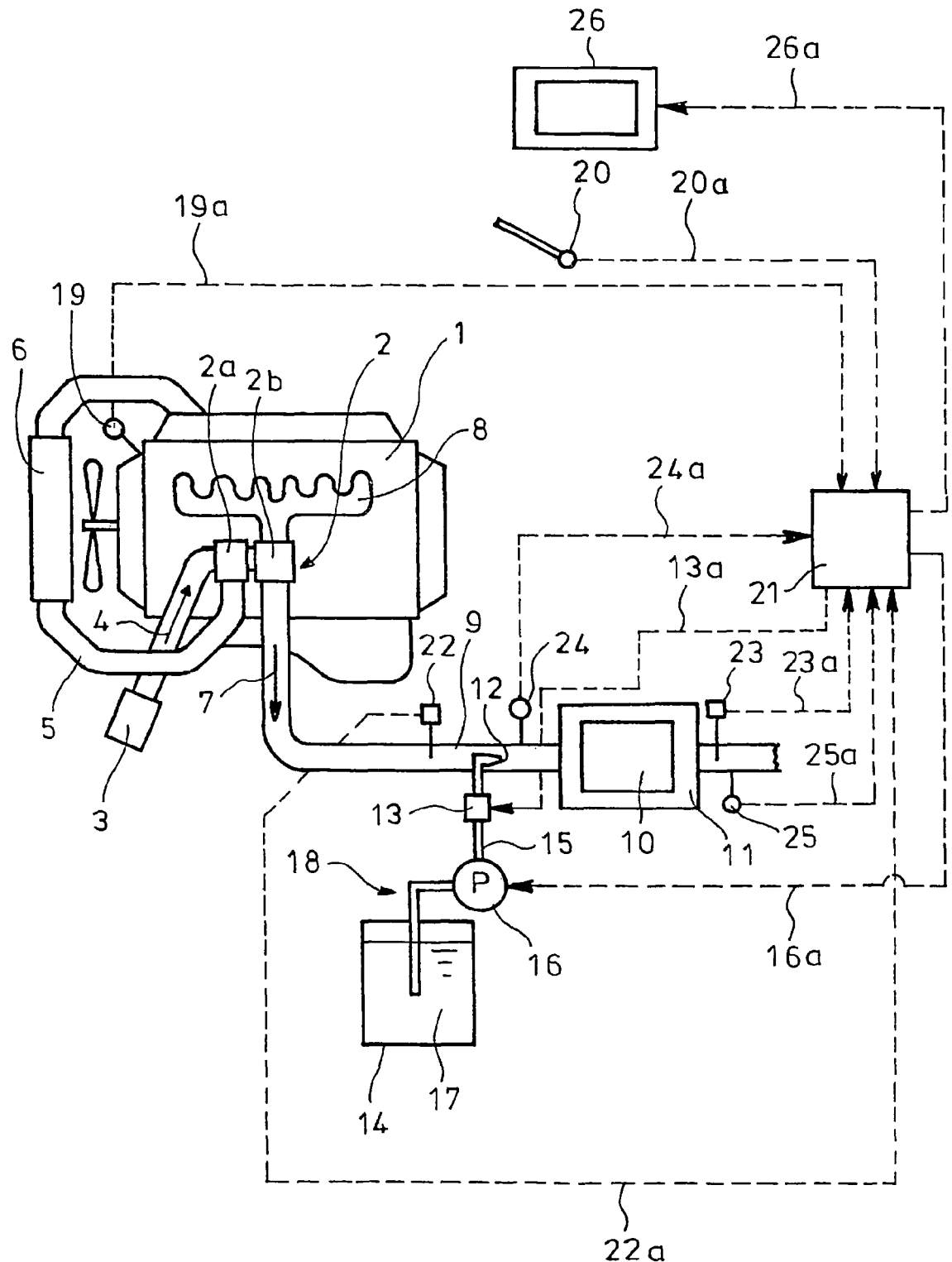
[FIG. 1] A schematic view showing an embodiment of the invention.

EXPLANATION OF THE REFERENCE NUMERALS 1 engine
9 exhaust pipe
10 selective reduction catalyst
17 urea water (reducing agent)
18 urea water addition means
19 revolution number sensor
19a revolution number signal
20 accelerator sensor
20a load signal
21 control unit
22 $NO_x$ sensor
22a detection signal
23 $NO_x$ sensor
23a detection signal
24 temperature sensor
24a detection signal
25 temperature sensor
25a detection signal

BEST MODE FOR CARRYING OUT THE INVENTION

An embodiment of the invention will be described in conjunction with the drawings.

Figure 2:
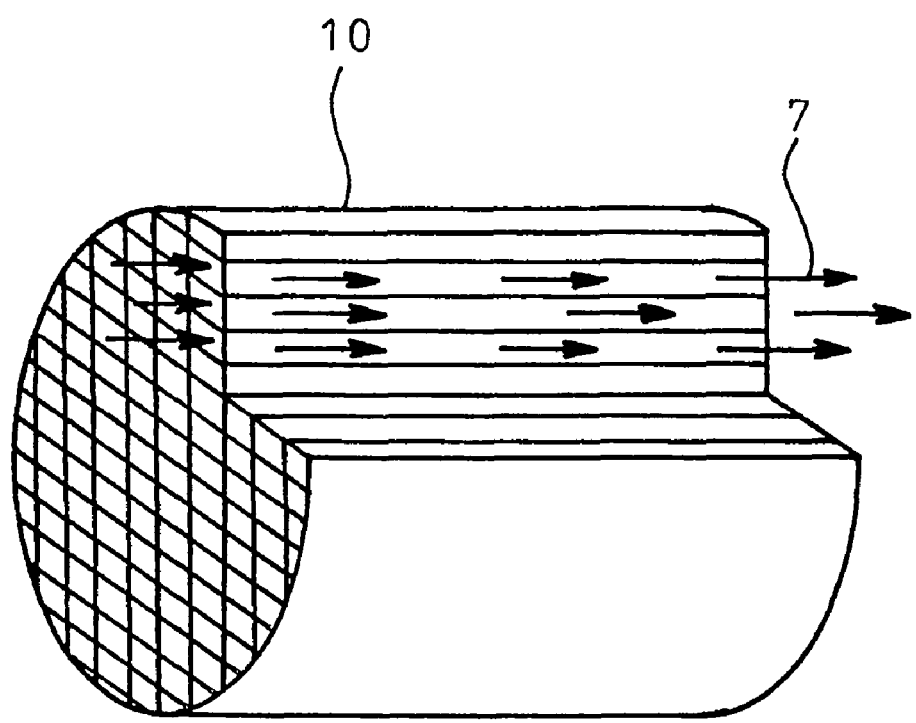
[FIG. 2] A partially cutaway view in perspective of the selective reduction catalyst shown in FIG. 1.

FIGS. 1 and 2 show the embodiment of the invention. In FIG. 1, reference numeral 1 denotes a diesel engine. The engine 1 illustrated has a turbocharger 2 with a compressor 2a to which air 4 from an air cleaner 3 is fed via an intake air pipe 5. The air 4 thus pressurized in compressor 2a is further fed to an intercooler 6 where it is cooled. The cooled air 4 from the intercooler 6 is guided to an intake manifold (not shown) and is introduced into each of cylinders in the engine 1.

Exhaust gas 7 discharged from each of the cylinders in the engine 1 is fed via an exhaust manifold 8 to a turbine 2b of the turbocharger 2. The exhaust gas 7 thus having driven the turbine 2b is discharged via an exhaust pipe 9 to outside of the vehicle.

Incorporated in the exhaust pipe 9 through which the exhaust gas 7 flows is selective reduction catalyst 10 carried by a casing 11. The catalyst 10 is formed as a flow-through type honeycomb structure as shown in FIG. 2 and has a feature of capable of selectively reacting $NO_x$ with ammonia even in the presence of oxygen.

Arranged upstream of the casing 11 is a urea water injection valve 13 with an injection nozzle 12. The injection valve 13 is connected through a urea water supply line 15 to a urea water tank 14 arranged in a required site. Actuation of a supply pump 16 incorporated in the supply line 15 causes urea water (reducing agent) 17 in the tank 14 to be added through the valve 13 and upstream of the catalyst 10. The injection valve 13, the tank 14, the supply line 15 and the supply pump 16 constitute the urea water addition means (reducing agent addition means) 18.

In the engine 1, a revolution number sensor 19 is arranged for detection of the revolution number of the engine. A revolution number signal 19a from the sensor 19 and a load signal 20a from an accelerator sensor 20 (sensor for detecting accelerator pedal stepped-in angle) are adapted to be inputted into an electronic control unit (ECU) 21 in the form of an engine controlling computer.

In the control unit 21, an amount of emission of $NO_x$ is estimated on the basis of a current operation status determined by a revolution number signal 19a from the sensor 19 and a load signal 20a from the sensor 20. An amount of urea water 17 to be added is calculated so as to be consistent with the estimated amount of emission of $NO_x$, and addition of the required amount of urea water 17 is carried out. More specifically, a valve-opening command signal 13a and actuation command signal 16a are outputted to the injection valve 13 and the supply pump 16, respectively. The amount of the urea water 17 to be added is properly controlled by opening of the valve 13, and injection pressure required for such addition is obtained by actuation of the pump 16.

Arranged on entry and exit sides of the casing 11 which carries the catalyst 10 are the $NO_x$ sensors 22 and 23 for detection of the $NO_x$ concentration and the temperature sensors 24 and 25 for detection of the exhaust temperature, respectively. Detection signals 22a, 23a, 24a and 25a therefrom are also inputted into the control unit 21 and, on the basis of these signals 22a, 23a, 24a and 25a, the abnormality detection of the $NO_x$ emission control system to be detailed hereinafter will be carried out in the control unit 21.

More specifically, in the control unit 21, a temperature of the catalyst 10 is estimated on the basis of the detection signals 24a and 25a from the temperature sensors 24 and 25 (if possible, the temperature of the catalyst 10 may be directly measured), and the temperature of the catalyst during the operation period is monitored to record cumulative time for each of temperature zones (for example, temperature zones starting from 100° C. and each with a pitch of 50° C.) in a rewritable memory after the engine is stopped.

The control unit 21 has therein a three-dimensional map of the $NO_x$ reduction performance to which the temperature of the catalyst and the cumulative time exposed over the temperature are inputted. And, on the basis of the cumulative time in each of the temperature zones, the deterioration coefficient of $NO_x$ reduction performance is retrieved and determined from the map for each of the temperature zones. Then, the standard $NO_x$ reduction ratio predetermined for each of the temperature zones is multiplied by said deterioration coefficient for each of the temperature zones to update the standard $NO_x$ reduction ratio.

More specifically, the selective reduction catalyst 10 incorporated in the exhaust pipe 9 gradually deteriorates since it is repeatedly exposed to high temperature condition for a long period of time; the degree of deterioration differs depending upon how many hours and to what degree of temperature zone it is disposed, so that the temperature of the catalyst during the operation period is monitored as mentioned above to record a cumulative time for each of the temperature zones. The standard $NO_x$ reduction ratio for each of the temperature zones is multiplied by the deterioration coefficient of the $NO_x$ reduction performance determined for each of the temperature zones on the basis of the recorded cumulative time to update the standard $NO_x$ reduction ratio; thus, the standard $NO_x$ reduction ratio for each of the temperature zones and in consideration of the deterioration with age of the catalyst 10 is estimated with high accuracy for each of the temperature zones.

In this case, it is preferable that amounts of emission of HC and CO are estimated on the basis of the current operating condition determined by the revolution number signal 19a from the sensor 19 and by the load signal 20a from the sensor 20. On the basis of the estimated amounts of emission of HC and CO, a poisoning coefficient of the selective reduction catalyst 10 due to HC and CO is retrieved and determined from the map. The standard $NO_x$ reduction ratio is further corrected by multiplying it by the determined poisoning coefficient. Thus, also in consideration of the poisoning deterioration of the catalyst 10 due to HC and CO, more accurate standard $NO_x$ reduction ratio can be calculated.

Thus updated standard $NO_x$ reduction ratio is used in a next operation to compare the actually measured $NO_x$ reduction ratio with the standard $NO_x$ reduction ratio in the measured temperature zone; when deviation of the actually measured $NO_x$ reduction ratio from the standard $NO_x$ reduction ratio falls within a required range (for example, ±2.5% or so: however, any adjustment may be made up to ±10% or so), it may be determined that $NO_x$ emission control system is normal in operation; on the other hand, when the deviation of the actually measured $NO_x$ reduction ratio from the standard $NO_x$ reduction ratio falls below the required range, it is determined that there is abnormal deterioration of the catalyst 10 whereas when the deviation of the actually measured $NO_x$ reduction ratio from the standard $NO_x$ reduction ratio is beyond the required range, it is determined that there is abnormality in the sensors such as the $NO_x$ sensors 22 and 23 and the temperature sensors 24 and 25. The determination result is transmitted as display information signal 26a to and displayed on a display unit 26 in a driver's cabin.

Such determination in the control unit 21 is carried out when the temperature of the catalyst is in a range from about 200° C. where the $NO_x$ reduction ratio begins to be obtained to the temperature (for example, about 350° C.) where a maximum $NO_x$ reduction ratio is obtained and a condition of the catalyst is determined as normal (it is determined as normal, for example, when deflection of the catalyst temperature is for about 20 seconds in ±5° C.).

When the standard $NO_x$ reduction ratio updated per operation is lower than a predetermined value, it can be regarded that the deterioration with age of the catalyst 10 has seriously progressed, so that it is determined in the control unit 21 that the catalyst 10 is to be replaced in near future, and, for example, forecast on when to replace the catalyst is displayed on the display unit 26 in the driver's cabin.

The above-mentioned actually measured $NO_x$ reduction ratio is that determined from comparison between $NO_x$ concentrations detected by the $NO_x$ sensors 22 and 23 on the entry and exit sides of the catalyst 10. However, the $NO_x$ sensors 22 and 23 themselves are also deteriorated with age and are gradually lowered in their output values since they themselves are exposed to high temperature condition; therefore, it is further preferable that said determined $NO_x$ reduction ratio is multiplied by a coefficient of deterioration with age retrieved from the map depending upon used hours of said $NO_x$ sensors 22 and 23 (which are counted by the timer function in the control unit 21), whereby the actually measured $NO_x$ reduction ratio is corrected in consideration of the deterioration with age of the $NO_x$ sensors 22 and 23.

Thus, when abnormality detection in the $NO_x$ emission control system is carried out by such control unit 21, the temperature of the catalyst during the operation period is monitored in the control unit 21 on the basis of the detection signals 24a and 25a from the temperature sensors 24 and 25 to record the cumulative time for each of the temperature zones, the standard $NO_x$ reduction ratio being multiplied by the deterioration coefficient of the $NO_x$ reduction performance determined on the basis of the recorded cumulative time for each of the temperature zones to update the standard $NO_x$ reduction ratio, so that the standard $NO_x$ reduction ratio is estimated with high accuracy in consideration of the deterioration with age of the catalyst 10 for each of the temperature zones.

Thus estimated standard $NO_x$ reduction ratio is used in a next operation to compare the actually measured $NO_x$ reduction ratio on the basis of the detection signals 22a and 23a from the $NO_x$ sensors 22 and 23 with the standard $NO_x$ reduction ratio in the measured temperature zone. When the deviation of the actually measured $NO_x$ reduction ratio from the standard or proper $NO_x$ reduction ratio falls within a required range, it is determined that the system is normal in operation; when the deviation of the actually measured $NO_x$ reduction ratio from the standard $NO_x$ reduction ratio falls below the required range, it is determined that there is abnormal deterioration of the catalyst 10; when the deviation of the actually measured $NO_x$ reduction ratio from the standard $NO_x$ reduction ratio is beyond the required range, it is determined that there is abnormality of the sensors such as the $NO_x$ sensors 22 and 23 and the temperature sensors 24 and 25. The determination result is displayed on the display unit 26 in the driver's cabin.

Thus, according to the above embodiment, the highly accurately estimated standard $NO_x$ reduction ratio in consideration of the deterioration with age of the catalyst 10 is compared with the actually measured $NO_x$ reduction ratio, so that abnormality in the $NO_x$ emission control system can be reliably detected. Moreover, when the deviation of the actually measured $NO_x$ reduction ratio from the standard $NO_x$ reduction ratio does not fall within the required range, abnormal deterioration of the catalyst 10 and abnormality in the sensors can be determined distinctly from each other depending upon whether the deviation falls below or is beyond the required range. As a result, prevented from occurring is a situation that an operation is continued without notice of deterioration of the catalyst 10 or abnormality in the sensors and resultant failure of attaining the target $NO_x$ reduction ratio.

Especially in the embodiment, the $NO_x$ reduction ratio is measured by the $NO_x$ sensors 22 and 23 arranged on the entry and exit sides of the catalyst 10 and the thus actually measured $NO_x$ reduction ratio is corrected by multiplying it by a coefficient of deterioration with age depending upon used hours of the $NO_x$ sensors 22 and 23. Furthermore, the standard $NO_x$ reduction ratio is further corrected by multiplying it by the poisoning coefficient determined on the basis of amounts of emission of HC and CO derived from the operating condition of the engine 1. As a result, the $NO_x$ reduction ratio can be determined more accurately in consideration of the deterioration with age depending upon used hours of the $NO_x$ sensors 22 and 23 and poisoning deterioration of the catalyst 10 due to HC and CO to thereby further enhance the accuracy of abnormality decision.

When the standard $NO_x$ reduction ratio updated per operation is lower than the predetermined value, it is determined in the control unit 21 that the catalyst 10 is to be replaced in near future, and, for example, forecast on when to replace the catalyst is displayed on the display unit 26 in the driver's cabin. This may be noticed by the driver to accelerate earlier replacement of the catalyst.

It is to be understood that a method for detecting abnormality in an exhaust emission control device of the invention is not limited to the above embodiment and that various changes and modifications may be made without leaving the gist of the invention. For example, diesel oil or the like other than the urea water is applicable as the reducing agent to be added for the selective reduction catalyst.

The invention claimed is:

1. A method for detecting abnormality in an exhaust emission control device for reduction and purification of $NO_x$ through addition of a reducing agent to selective reduction catalyst incorporated in an exhaust pipe, comprising monitoring a temperature of the catalyst during an operation period to record cumulative time for each of temperature zones, determining a deterioration coefficient of $NO_x$ reduction performance for each of the temperature zone on the basis of the recorded cumulative time for each of the temperature zones, multiplying a standard $NO_x$ reduction ratio predetermined for each of the temperature zones by said determined deterioration coefficient for each of the temperature zones to update the standard $NO_x$ reduction ratio, using the updated standard $NO_x$ reduction ratio in a next operation to compare an actually measured $NO_x$ reduction ratio with the standard $NO_x$ reduction ratio on a measured temperature zone, and determining presence of abnormality when deviation of the actually measured $NO_x$ reduction ratio from the standard $NO_x$ reduction ratio does not fall within a required range.

2. A method for detecting abnormality in an exhaust emission control device as claimed in claim 1, wherein the $NO_x$ reduction ratio is measured by $NO_x$ sensors arranged on entry and exit sides of the catalyst, said actually measured $NO_x$ reduction ratio being multiplied for correction by a coefficient of deterioration with age depending upon used hours of the $NO_x$ sensors.

3. A method for detecting abnormality in an exhaust emission control device as set forth in claim 1, wherein a poisoning coefficient is determined on the basis of amounts of emission of HC and CO derived from an operating condition of the engine, the standard $NO_x$ reduction ratio being further multiplied for correction by said poisoning coefficient.

4. A method for detecting abnormality in an exhaust emission control device as set forth in claim 2, wherein a poisoning coefficient is determined on the basis of amounts of emission of HC and CO derived from an operating condition of the engine, the standard $NO_x$ reduction ratio being further multiplied for correction by said poisoning coefficient.

5. A method for detecting abnormality in an exhaust emission control device as set forth in claim 1, wherein it is determined that there is abnormal deterioration of the catalyst when the deviation of the actually measured $NO_x$ reduction ratio to the standard $NO_x$ reduction ratio falls below the required range, and it is determined that there is abnormality in sensors when the deviation is beyond the required range.

6. A method for detecting abnormality in an exhaust emission control device as set forth in claim 2, wherein it is determined that there is abnormal deterioration of the catalyst when the deviation of the actually measured $NO_x$ reduction ratio to the standard $NO_x$ reduction ratio falls below the required range, and it is determined that there is abnormality in sensors when the deviation is beyond the required range.

7. A method for detecting abnormality in an exhaust emission control device as set forth in claim 3, wherein it is determined that there is abnormal deterioration of the catalyst when the deviation of the actually measured $NO_x$ reduction ratio to the standard $NO_x$ reduction ratio falls below the required range, and it is determined that there is abnormality in sensors when the deviation is beyond the required range.

8. A method for detecting abnormality in an exhaust emission control device as set forth in claim 4, wherein it is determined that there is abnormal deterioration of the catalyst when the deviation of the actually measured $NO_x$ reduction ratio to the standard $NO_x$ reduction ratio falls below the required range, and it is determined that there is abnormality in sensors when the deviation is beyond the required range.

9. A method for detecting abnormality in an exhaust emission control device as set forth in claim 1, wherein it is determined that the catalyst is to be replaced in near future when the standard $NO_x$ reduction ratio is lower than a predetermined value.

10. A method for detecting abnormality in an exhaust emission control device as set forth in claim 2, wherein it is determined that the catalyst is to be replaced in near future when the standard $NO_x$ reduction ratio is lower than a predetermined value.

11. A method for detecting abnormality in an exhaust emission control device as set forth in claim 3, wherein it is determined that the catalyst is to be replaced in near future when the standard $NO_x$ reduction ratio is lower than a predetermined value.

12. A method for detecting abnormality in an exhaust emission control device as set forth in claim 4, wherein it is determined that the catalyst is to be replaced in near future when the standard $NO_x$ reduction ratio is lower than a predetermined value.

13. A method for detecting abnormality in an exhaust emission control device as set forth in claim 5, wherein it is determined that the catalyst is to be replaced in near future when the standard $NO_x$ reduction ratio is lower than a predetermined value.

14. A method for detecting abnormality in an exhaust emission control device as set forth in claim 6, wherein it is determined that the catalyst is to be replaced in near future when the standard $NO_x$ reduction ratio is lower than a predetermined value.

15. A method for detecting abnormality in an exhaust emission control device as set forth in claim 7, wherein it is determined that the catalyst is to be replaced in near future when the standard $NO_x$ reduction ratio is lower than a predetermined value.

16. A method for detecting abnormality in an exhaust emission control device as set forth in claim 8, wherein it is determined that the catalyst is to be replaced in near future when the standard $NO_x$ reduction ratio is lower than a predetermined value.

* * * * *